April 16, 1963

W. T. EVERINGTON 3,085,604

CITRUS FRUIT COMMINUTOR

Filed May 27, 1960

INVENTOR
William Tom Everington
BY
Pierce, Scheffler & Parker
ATTORNEY

INVENTOR
William Tom Everington
BY
Pierce, Schiffler & Parker
ATTORNEYS

United States Patent Office 3,085,604
Patented Apr. 16, 1963

3,085,604
CITRUS FRUIT COMMINUTOR
William Tom Everington, Coral Oak End Way, West Byfleet, England, assignor, by mesne assignments, to J. Lyons & Company, Limited, London, England, a British company
Filed May 27, 1960, Ser. No. 32,296
Claims priority, application Great Britain May 28, 1959
1 Claim. (Cl. 146—3)

This invention relates to the manufacture of beverages and the like from citrus fruits. Commercially, oranges are the most important citrus fruits, and lemons are also important; the invention will be described in relation to oranges and lemons, though it is not thereby to be inferred that the invention is limited thereto.

The apparatus of the invention is intended for use in a process of making citrus fruit products in which whole fruit is comminuted and the comminuted fruit added to a sugar syrup. The process can be carried in a batch system by immersing the comminuted fruit in the syrup immedately after comminution and after a period of time the solids and liquids are separated. Alternatively, the comminuted fruit is, after comminution, separated into its liquid and solid components, and syrup added to the liquid part.

The present invention provides an apparatus which is particularly adapted for the latter process, though it can be used in the former, and the invention consists broadly of an apparatus for the comminution of whole citrus fruit and comprising a hopper, a plurality of whole fruit comminuting devices for discharging comminuted fruit into said hopper, agitating means for agitating comminuted fruit in said hopper, and feed means for feeding comminuted fruit from said hopper.

Other features and advantages of the invention will appear from the following description of embodiments thereof given by way of example, in conjunction with the accompanying drawings, in which.

Figure 1:
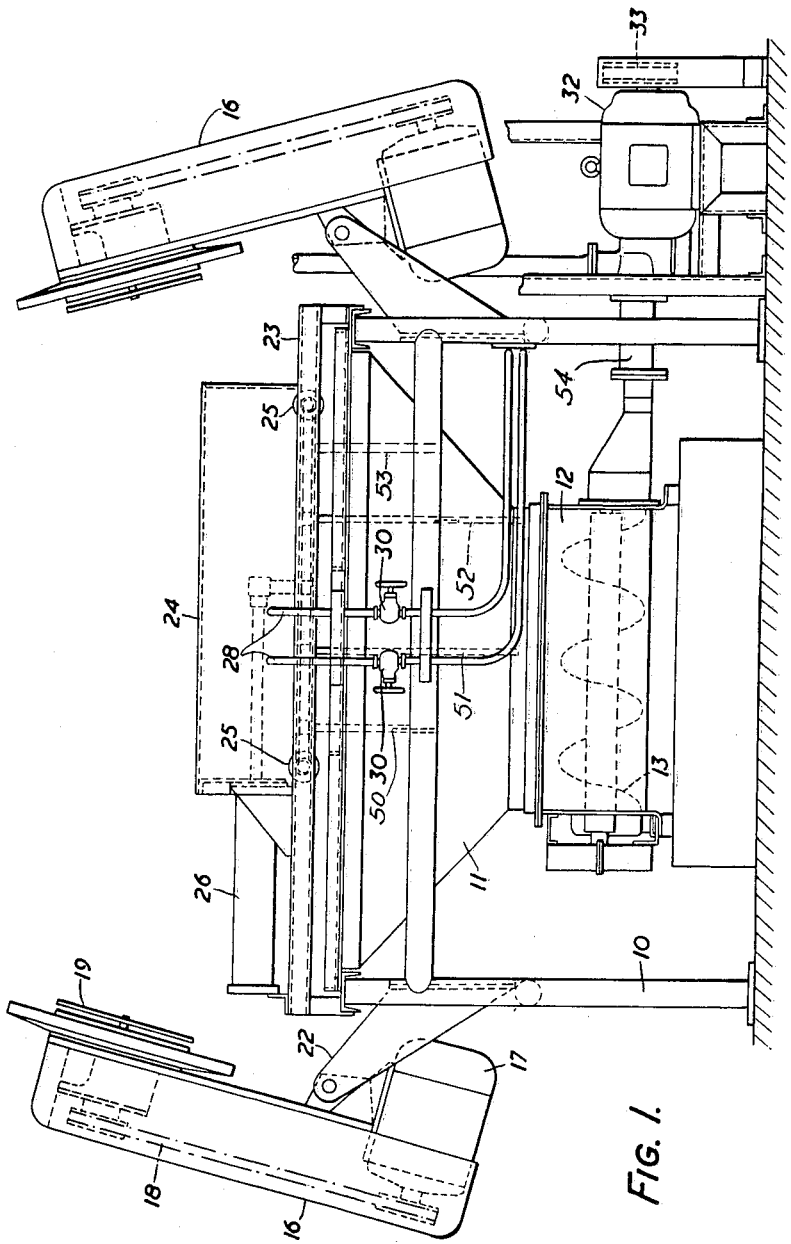
FIGURE 1 is an elevation of a comminuting apparatus with the cutting heads in raised position.

In the apparatus shown in these drawings a fabricated steel framework 10 supports a tank 11 of approximately truncated pryramidal shape. The sides of the tank or hopper converge to a channel part 12 within which fits an open feed screw 13 driven by an electric motor 14 by a belt drive 15.

Surmounting the tank are four cutter head units 16; these units are similar and each includes a frame at one end of which is an electric motor 17 driving through a belt drive 18 a cutter disc 19. The disc cutters used in the apparatus described herein are each fed with oranges via a curved channel whose cross-section diminishes and along which the fruit are driven as a result of the rotation of the disc. Each disc is apertured and has a knife set in each aperture, these knives slicing the fruit, whereafter the slices fall through the apertures. Such an arrangement is described in British patent specifications Nos. 481,356 and 483,036, both to W. C. Hill. Whole oranges are fed, through an opening 21, to the upper side of the disc; each disc has in it a series of knives which cut the whole fruit finely, the comminuted fruit falling by gravity from the under side of the disc into the tank beneath. Each cutter unit is individually and independently pivotally mounted on one of a series of brackets 22, so that the units can be swung clear of the tank in an individual and independent manner, as shown in FIGURE 1. This feature enables one or more of the cutter head units 16 to be swung clear of the tank for purposes of cleaning or such other servicing as may be required while the remainder of the units are kept in operation.

A reciprocating agitating means is mounted in the tank. Mounted on the top of the main frame 10 is a secondary frame 23; a carriage 24, fitted wtih rollers 25 can reciprocate on the secondary frame under the power of a double acting pneumatic cylinder 26. Below the carriage are supported agitating paddles which accordingly reciprocate in the tank. Water can be fed into the tank, for cleaning, from water points 28, under the control of cocks 30.

As can be seen from the broken line representations in the drawings, there are four paddles 50, 51, 52 and 53. These paddles are parallel to each other, the outer pair 50, 53 being smaller in length and width than the inner pair 51, 52. The paddle carriage 24, is as already mentioned, reciprocated by a double-acting pneumatic cylinder 26. This is controlled by automatic stops at each end of the reciproactory path; when the carriage reaches one end of its travel one of the stops is contacted, which operates switch means to reverse the direction of travel of the piston in the cylinder 26, and hence, of the carriage 24. Such means are well-known per se, and are not shown in FIGURES 1 and 2 to avoid unnecessarily complicating these figures. The carriage is reciprocated so as to perform 10 to 20 complete reciprocations per minute, the rate being adjusted so as to get results satisfactory to the user.

Figure 2:
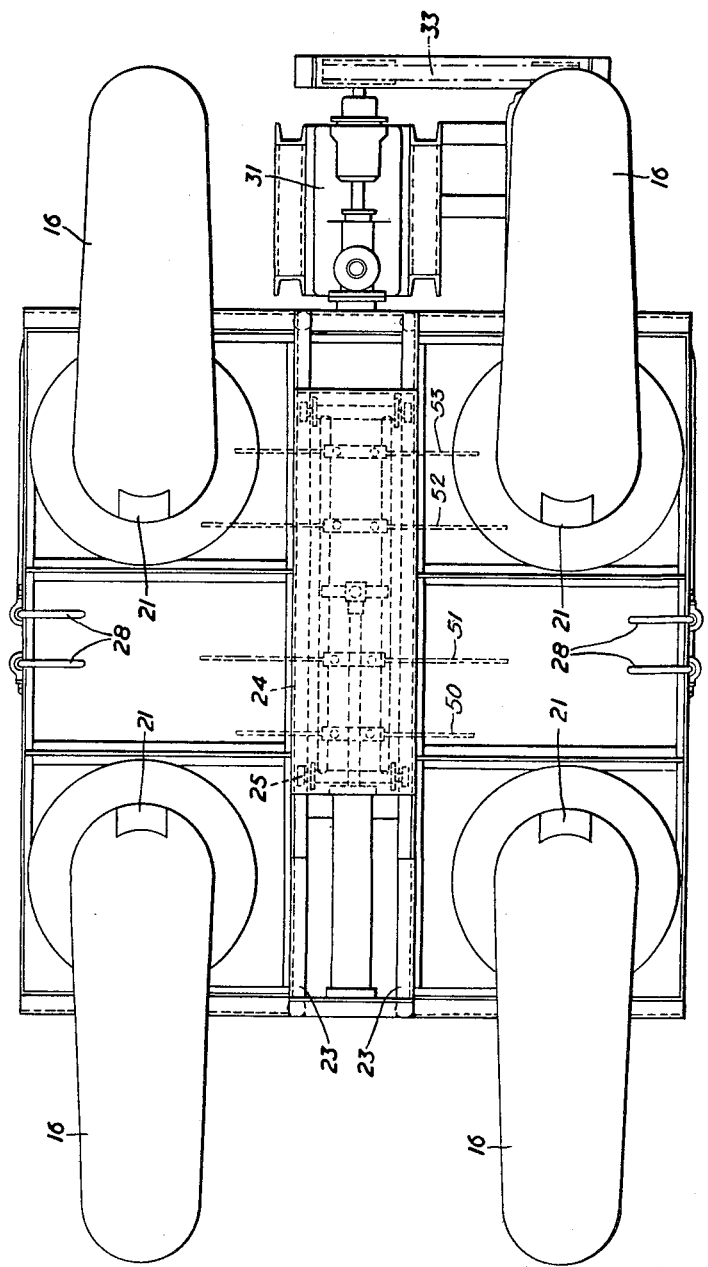
FIGURE 2 is a plan view of the same apparatus but with the cutting heads in lowered position.
Figure 3:
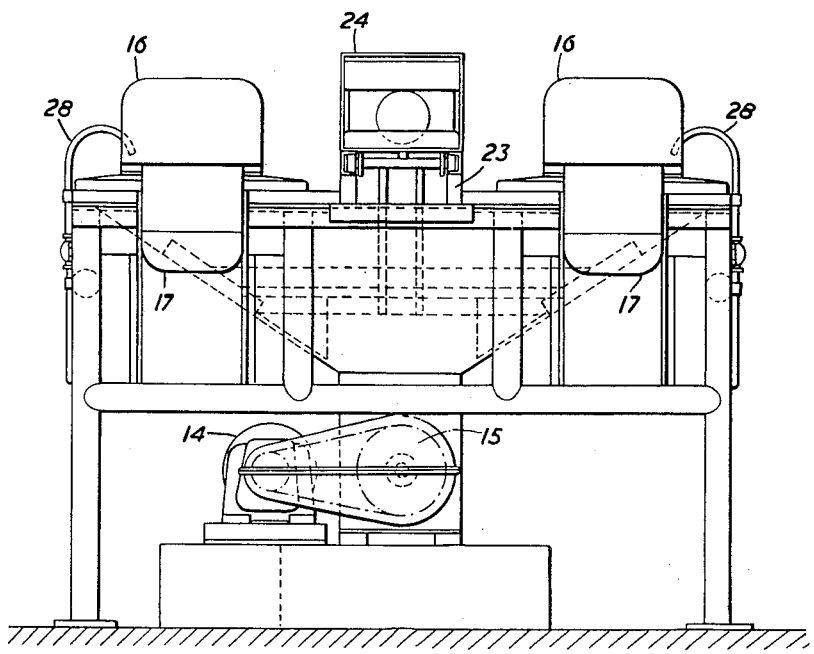
FIGURE 3 is an end elevation of the same apparatus.

The comminuted fruit is pumped from the lower part of the container, from the outlet end of the feed screw via a pipe 54, by a pump 31, preferably of the "Mono" type, driven by a further electric motor 32, through belt drive 33. The pump 31, which can be seen in FIGURE 2, is not visible in FIGURE 1 because it is concealed from view by the motor 32, which drives it by belt drive 33. In addition to feeding the fruit from the container, this pump assists also in agitating the liquid.

From the pump 31, the fruit passes to apparatus for separating the solids from the liquids.

I claim:

An apparatus for the comminution of whole citrus fruits, and comprising a hopper of generally truncated pyramidal form whose sides converge towards an outlet orifice at the bottom of said hopper, in which hopper can be collected the results of the comminution of said citrus fruits, a plurality of whole fruit comminution devices each of which has an inlet to which the fruit to be comminuted can be supplied and an outlet from which the results of the comminution can be discharged under the influence of gravity into said hopper, said comminuting devices being individually and independently mounted above said hopper and being individually and independently pivotal between a non-operative position adopted for cleaning and servicing purposes and an operative position in which said discharge of comminution products into said hopper can occur, agitating means comprising a plurality of paddles arranged in said hopper and means for imparting a reciprocatory motion to said paddles so as to agitate comminution products in said hopper, and feeding means comprising a screw feed device in a trough-like container having an inlet in register with the outlet orifice from said hopper so that said screw feed device can receive the comminution products after they have been subjected to agitation by said paddles, said feeding means being arranged to feed the comminution products away from said hopper.

References Cited in the file of this patent

UNITED STATES PATENTS

| | | |
|---|---|---|
| 1,181,406 | Potter | May 2, 1916 |
| 1,988,542 | Coleman et al. | Jan. 22, 1935 |
| 2,061,868 | Fitzgerald | Nov. 24, 1936 |
| 2,200,061 | Green | May 7, 1940 |
| 2,333,246 | Harris | Nov. 2, 1943 |
| 2,373,682 | Hodson | Apr. 17, 1945 |
| 2,550,895 | Weismueller | May 1, 1951 |
| 2,746,732 | Guillette | May 22, 1956 |